E. C. HAMMOND & C. F. NELSON.
TRACTOR.
APPLICATION FILED DEC. 16, 1916.
1,297,154.
Patented Mar. 11, 1919.
3 SHEETS—SHEET 1.
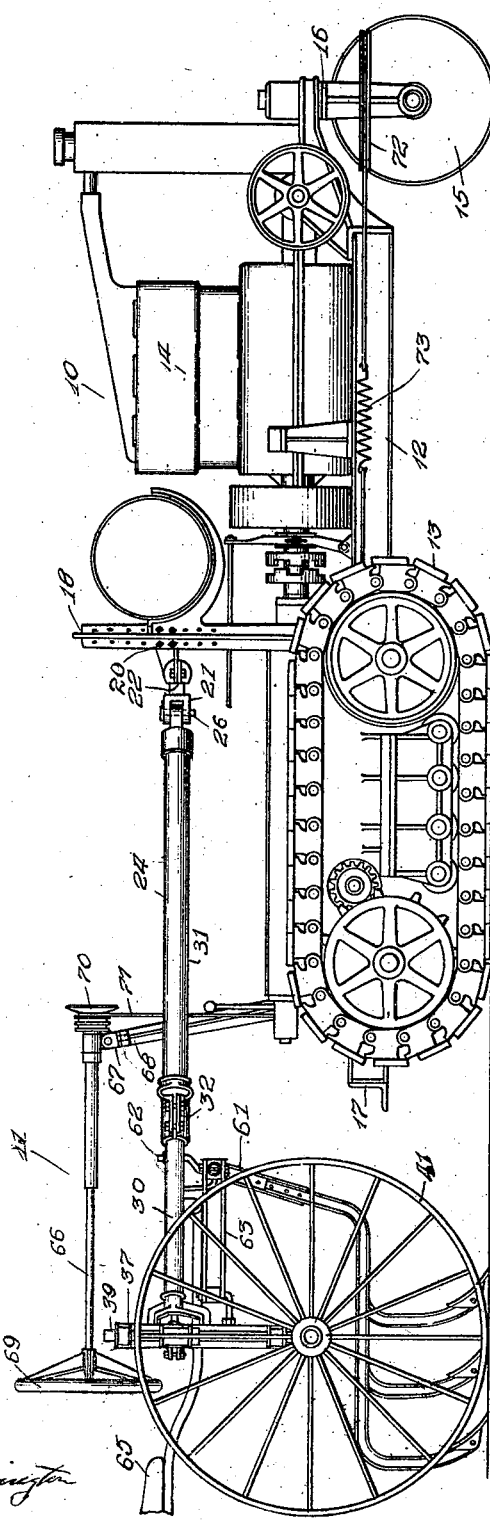

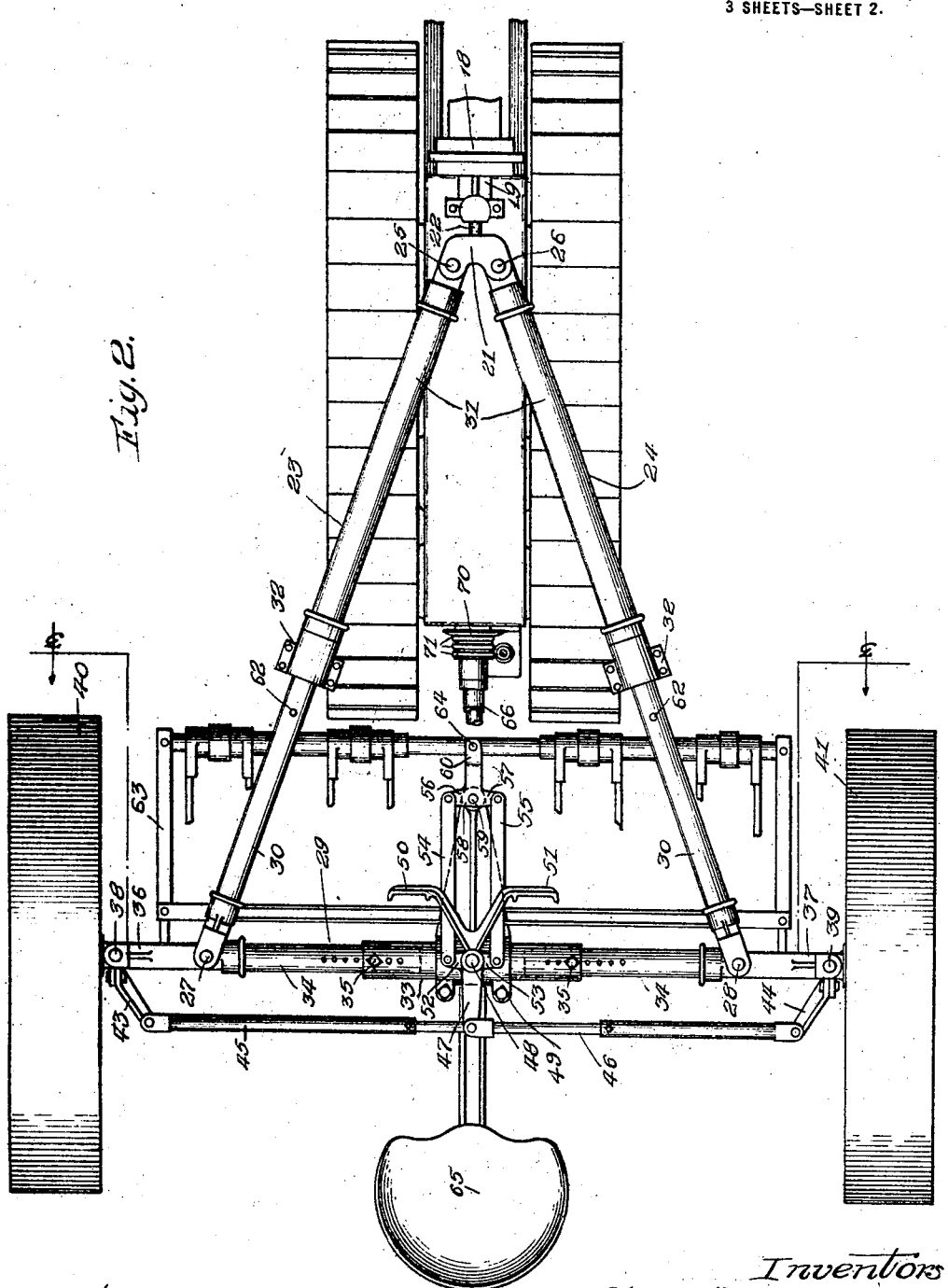

E. C. HAMMOND & C. F. NELSON.
TRACTOR.
APPLICATION FILED DEC. 16, 1916.
1,297,154.
Patented Mar. 11, 1919.
3 SHEETS—SHEET 3.
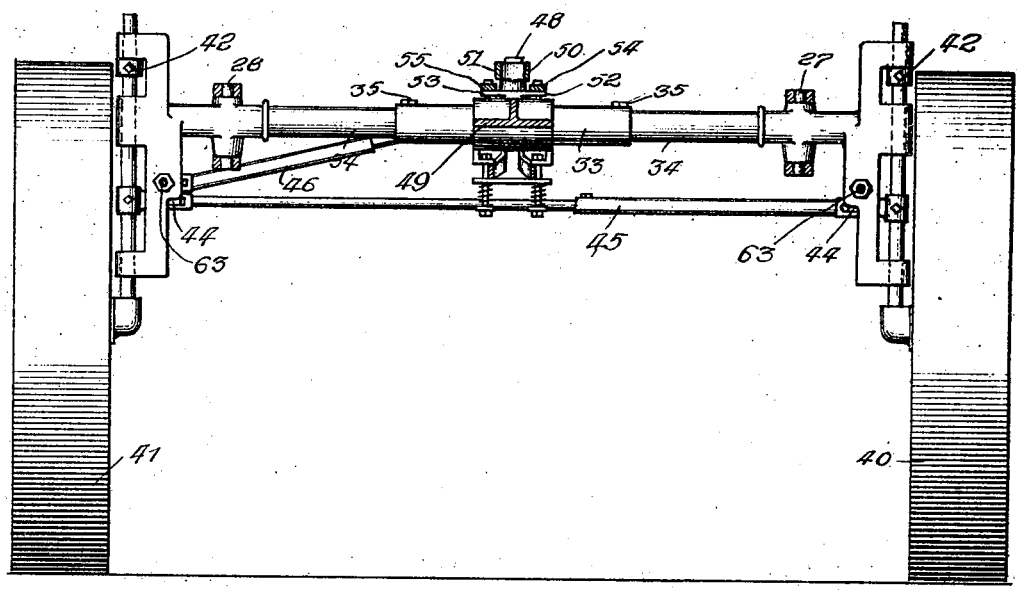
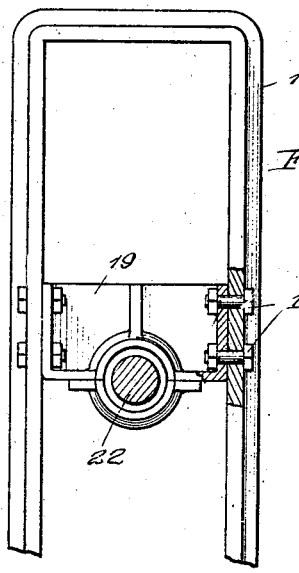
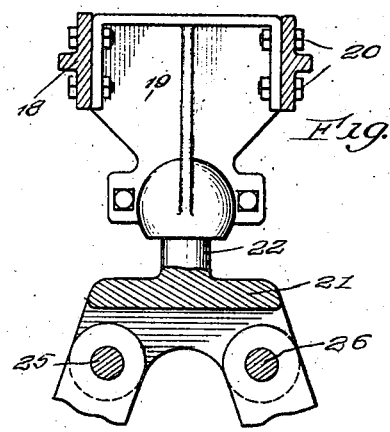
Witness:
R. L. Farrington
Inventors
Elmer Clyde Hammond,
Carl F. Nelson
By Glenn S. Noble Atty.

UNITED STATES PATENT OFFICE.

ELMER CLYDE HAMMOND, OF CRAWFORDSVILLE, INDIANA, AND CARL F. NELSON, OF MINNEAPOLIS, MINNESOTA.

TRACTOR.

1,297,154.           Specification of Letters Patent.      Patented Mar. 11, 1919.

Application filed December 16, 1916. Serial No. 137,404.

*To all whom it may concern:*

Be it known that we, ELMER CLYDE HAMMOND and CARL F. NELSON, citizens of the United States, and residing, respectively, at Crawfordsville, in the county of Montgomery and State of Indiana, and Minneapolis, in the county of Hennepin and State of Minnesota, have invented certain new and useful Improvements in Tractors, of which the following is a specification.

This invention relates to a tractor which is adapted for pulling various and sundry tools or implements, and is particularly adapted for farm purposes or use in pulling plows, drags, cultivators, harvesters and the like.

The objects of the present invention are to provide an improved form of tractor which may be readily adjusted for pulling different tools or implements; to provide a tractor of the character set forth, which may be operated by one man; to provide a tractor comprising a pulling element and an adjustable trailing member for carrying the operator, and also to provide for attaching certain implements; and to provide a tractor having such advantages and improvements in construction as will be described more fully hereinafter.

In the accompanying drawings illustrating this invention:

Figure 1 is a side view of the tractor, parts being omitted or shown diagrammatically for convenience in illustration;

Fig. 2 is a plan view of the rear portion of the tractor shown on an enlarged scale;

Fig. 3 is a rear view, partially in section; and

Figs. 4 and 5 are details of the connection for the trailing element.

As shown in these drawings, 10 represents the main portion of the tractor or pulling element which may be of any ordinary or preferred form of construction, and 11 the rear portion or trailing element. The pulling element or power driven portion of the tractor as herein shown comprises a frame 12 of any ordinary or preferred form of construction, with traction means such as the traction devices or caterpillars 13, which are driven by means of any suitable mechanism from the engine 14. One or more of these traction elements may be used or traction wheels may be utilized in place of the caterpillars, if desired. The pulling element is also provided with a front steering wheel 15, which is mounted in a fork 16, pivoted in the front end of the frame 12. The frame 12 is provided at its rear end with any sort of coupling 17, for attachment to plows or other implements, which may be readily connected directly to the frame.

The frame 12 is also provided with a vertical yoke or guide member 18, to provide attachment for the trailing element 11. A vertically adjustable block or bracket 19 fits in the yoke 18, and is held in position in any suitable manner, as by means of bolts 20. A second block or attachment member 21 is pivotally connected to the bracket 19, preferably by means of a universal joint 22. Two rods 23 and 24 are pivotally connected at 25 and 26 to the attachment member 21. These rods are pivotally connected at 27 and 28 to the outer ends of an axle 29. The rods 23 and 24 are preferably made so that they can be adjusted lengthwise. This is conveniently done by having the outer portions of the arms formed of pipes or tubes 30, which telescope with the inner portions formed of larger pipes or tubes 31, clamps 32 being provided for clamping the pipes or rods 30 in adjusted position.

The axle 29 is also longitudinally adjustable. This may be accomplished by having the central portion 33 made tubular and sufficiently large to receive the end portions 34, the end portions being provided with holes for receiving the fastening bolts 35. The ends of the axle 29 are provided with forks 36 and 37 for the knuckles 38 and 39 of the wheels 40 and 41. The forks 36 and 37 may be adjusted vertically on their respective spindles, and are held in raised position in any desired manner, as by means of collars 42. The knuckles 38 and 39 are provided with rearwardly extending arms 43 and 44, which are connected together by means of an adjustable rod or link 45. The arm 44 is also connected by means of an adjustable rod 46 with one arm 47 of a bell-crank lever, which is pivoted at 48 to a bracket 49, secured to the axle 29. The arm 47 is also secured to or formed integrally with foot levers 50 and 51. It is also secured to or formed integrally with levers 52 and 53, which are connected respectively by means of links 54 and 55 with the arms 56 and 57 of a second bell-crank lever 58, which is pivoted at 59 to a part of the main frame.

The bell-crank lever 58 has a forwardly extending arm 60, which may be connected with the front or guiding portion of any tool or implement which is to be pulled by the tractor. In this instance the tractor is shown as pulling a cultivator 61. The cultivator is pivotally attached at 62 to the arms 23 and 24, and its frame 63 is provided with pivoted corners, so that the frame may yield to permit the easy guiding of the cultivator. The bell-crank arm 60 is pivotally connected at 64 to the front transverse member of the frame 63.

A seat 65 is mounted on the axle 29, in such position that the operator can reach the pedals 50 and 51 conveniently. The steering mechanism for the tractor is also arranged so that the operator can also guide the tractor from his position on the seat. While this may be done in any suitable manner, we have shown a preferred form or arrangement in the drawings, whereby the operator may easily retain control of the steering wheel regardless of the relative positions of the tractor or propelling unit proper 10 and the trailing unit 11. This is accomplished by having the steering post 66 pivoted at 57 to an upright or standard 68 from the main frame 12, so that the free end of the post carrying the steering wheel 69 may be moved up and down. This post is longitudinally adjustable, and its inner end 66 provided with a drum 70 for the steering ropes or cables 71. These cables are carried around guide sheaves on either side of the machine, and connected at their front ends with segments 72, secured to either side of the fork 16. The cables 71 are preferably provided with tension springs 73, so that they will be held taut on the steering drum and segments.

On account of having the arms 23 and 24 made adjustable, the position of the rear axle may be adjusted with respect to the propelling unit, so that the position of the operator may be varied for different machines or implements which are to be pulled. The axle 29 also being adjustable permits the changing of the tread of the wheels 40 and 41 to adjust them to different widths of implements, or to adjust them in accordance with the distance between rows of corn or the like which is to be cultivated. The vertical adjustment of the axle and connecting rods permits these parts to be raised or lowered for different implements. The adjustment of the steering knuckles also permits one wheel to be lowered with respect to the other, so that such wheel may run in a furrow without tipping the trailing unit.

The operation of the machine will be readily understood from the above description and the accompanying drawings. It is of course understood that the propelling unit is provided with suitable clutches and engine governing apparatus, but such details form no part of the present invention. With a cultivator attached in the manner shown, the operator sitting on the seat 65 may guide the propelling unit by turning the hand wheel 69, and as the steering post is pivotally connected with the propelling unit, he may retain his grasp on the wheel, and hold it in any desired position vertically and longitudinally, without regard to the longitudinal tipping or changing of position of the propelling unit. Furthermore, by pressing on the right or left pedal, he may guide the trailing unit more or less independently of the propelling unit. At the same time, he can also swing the frame 63 of the cultivator so as to guide the cultivator also. On account of his being able to guide the trailing unit, he may manipulate the cultivator laterally for any desired purpose without changing the direction of the propeller unit. He may also hold the trailer unit to a more direct course at the corners, so as to require a minimum amount of room in which to turn. This construction will also have various other advantages in operation which will be readily understood by those familiar with operating such machinery.

It will be observed that the various parts may be changed or their positions altered without departing from the spirit of this invention, and therefore we do not wish to limit ourselves to the exact construction herein shown and described, except as specified in the following claims in which we claim:

1. In a tractor, the combination of a propelling unit, a dirigible trailing unit connected to said propelling unit, a seat carried by said trailing unit, and means operable from the seat for guiding the propelling unit, and other means also operable from the seat for guiding the trailing unit.

2. In a tractor, the combination of a self-propelled unit having a steering wheel, an axle, and pair of wheels arranged at the rear of said self-propelled unit, an adjustable connection between said axle and wheels and the self-propelled unit, a seat carried by said axle, means for steering said wheels, and means operable from the seat for actuating the steering wheel of the self-propelled unit.

3. In a tractor, the combination of a propelling unit, with a unit extending at the rear of the propelling unit and connected thereto by means of adjustable arms, one end of said arms being connected to the unit by a universal joint, means for raising and lowering the joint connection, said arms being pivotally supported at their other ends by an adjustable cross member, wheels on which said cross member is adjustably mounted, and means for steering said wheels.

4. The combination with a self-propelled vehicle having a vertical support, of a bracket adjustably mounted in said support, two adjustable arms connected to said bracket by a universal joint, a longitudinally adjustable axle pivotally connected to the outer ends of said arms, vertically adjustable steering knuckles carried by the outer ends of said axle, wheels mounted on said knuckles, a seat carried by said axle, a foot lever, connections between said lever and said knuckles for steering the wheels, a steering post pivotally connected to the rear end of said self-propelled unit, a steering wheel at the outer end of said post, positioned to be conveniently reached from the seat, and steering mechanism from the post to the self-propelled vehicle, for steering the vehicle.

5. In an apparatus of the character set forth, the combination of a self-propelled vehicle with a dirigible trailing unit pivotally attached thereto, means for attaching implements to said trailing unit, means for steering the wheels of the trailing unit, and means operable from the trailing unit for steering the vehicle.

6. In an apparatus of the character set forth, the combination of a self-propelled vehicle with a dirigible trailing unit pivotally connected to the vehicle, means for steering the trailing unit, a manually controlled, laterally movable device for connecting implements to said unit, and means operable from the trailing unit for steering the vehicle.

ELMER CLYDE HAMMOND.
CARL F. NELSON.